United States Patent
Eo et al.

(10) Patent No.: US 8,998,772 B2
(45) Date of Patent: Apr. 7, 2015

(54) AUTOMATED MANUAL TRANSMISSION FOR VEHICLE

(71) Applicant: Hyundai Motor Company, Seoul (KR)

(72) Inventors: Soon Ki Eo, Whasung-Si (KR); Dong Soo Lee, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 173 days.

(21) Appl. No.: 13/737,721

(22) Filed: Jan. 9, 2013

(65) Prior Publication Data

US 2014/0011634 A1 Jan. 9, 2014

(30) Foreign Application Priority Data

Jul. 4, 2012 (KR) .................. 10-2012-0072678

(51) Int. Cl.
*B60W 10/00* (2006.01)
*F16H 3/08* (2006.01)
*B60W 10/02* (2006.01)
*B60W 10/101* (2012.01)
*B60W 10/11* (2012.01)

(52) U.S. Cl.
CPC ............. *B60W 10/02* (2013.01); *B60W 10/101* (2013.01); *B60W 10/11* (2013.01)

(58) Field of Classification Search
USPC .................. 477/79; 74/325, 329, 331
See application file for complete search history.

(56) References Cited

U.S. PATENT DOCUMENTS

| | | | | |
|---|---|---|---|---|
| 1,724,202 | A * | 8/1929 | Werner | 74/357 |
| 2,949,047 | A * | 8/1960 | Burckhardt | 74/731.1 |
| 2,972,899 | A * | 2/1961 | Wiggermann | 74/329 |
| 6,819,997 | B2 * | 11/2004 | Buchanan et al. | 701/67 |
| 7,171,867 | B2 * | 2/2007 | McCrary et al. | 74/331 |

* cited by examiner

*Primary Examiner* — Tisha Lewis
(74) *Attorney, Agent, or Firm* — Morgan, Lewis & Bockius LLP

(57) ABSTRACT

An automated manual transmission for a vehicle may include a shifting section provided with a plurality of shifting units for implementing different gear ratio between an input shaft and an output shaft, and a variable power transfer unit transferring continuously and variably power of a power providing device to the shifting section in series by self-controllable slip operation, wherein the variable power transfer unit may be disposed between the power providing device and the shifting section.

16 Claims, 7 Drawing Sheets

AUTOMATED MANUAL TRANSMISSION FOR VEHICLE

CROSS-REFERENCE TO RELATED APPLICATION

The present application claims priority to Korean Patent Application No. 10-2012-0072678, filed on Jul. 4, 2012, the entire contents of which is incorporated herein for all purposes by this reference.

BACKGROUND OF THE INVENTION

1. Field of the Invention

The present disclosure relates to an automated manual transmission. More particularly, it relates to a configuration of the automated manual transmission which makes it possible to improve non-smooth shifting, such as pulling, when shifting.

2. Description of Related Art

The gears of automated manual transmissions are automatically changed by an actuator while a vehicle travels so that they can provide convenience similar to automatic transmissions and contribute to improving fuel efficiency of a vehicle with power transmission efficiency better than automatic transmissions.

However, for an automated manual transmission based on a synchro-mesh type of shifting mechanism, power is necessarily instantaneously block even during shifting that is automatically performed by an actuator and as a result produced torque decreases and thus the non-smooth shifting, as if a vehicle is pulled back, is generated.

The description provided above as a related art of the present invention is just for helping understanding the background of the present invention and should not be construed as being included in the related art known by those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an automated manual transmission that can improve the commercial value of a vehicle by preventing non-smooth shifting to achieve smooth and stable shifting feeling, by transferring a separate power to a driving wheel during a shifting while using a conventional shifting mechanism in which power is blocked instantaneously necessarily and connected.

An automated manual transmission for a vehicle may include a shifting section provided with a plurality of shifting units for implementing different gear ratio between an input shaft and an output shaft, and a variable power transfer unit transferring continuously and variably power of a power providing device to the shifting section in series by self-controllable slip operation, wherein the variable power transfer unit is disposed between the power providing device and the shifting section.

The automated manual transmission for the vehicle may further include a driving gear selectively engaged to the power providing device, a driven gear that is connected to the variable power transfer unit and meshes with the driving gear to transfer the power of the power providing device to the variable power transfer unit, and a transfer gear coupled to the variable power transfer unit and receiving the power having passed through the variable power transfer unit from the driven gear.

The driven gear, the variable power transfer unit and the transfer gear are arranged coaxially each other and are arranged parallel to the input shaft and the output shaft.

A clutch unit providing selectively the power from the power providing device to the input shaft or to the variable power transfer unit is provided between the power providing device and the input shaft, wherein the power providing device is an engine of an internal combustion engine, wherein the clutch unit may include a clutch disk that is connected to the input shaft and is selectively in contact with a fly wheel of the engine, and wherein the driving gear is connected to a hollow shaft coupled to a clutch cover which surrounds an outer part of the clutch disk, the input shaft configured to pass through the hollow shaft.

The transfer gear is meshed with a shifting gear of the input shaft that forms a middle gear ratio among a series of gear ratios implemented in the shifting section.

The clutch is a double disk clutch provided with a plurality of clutch disks.

A shifting mechanism of the shifting section is configured in a synchro-mesh way in which a plurality of gears is synchronized and then meshed using a key and a synchronizer ring.

A shifting mechanism of the shifting section is configured by using a dog clutch.

A rear driving idle gear is arranged between the input shaft and the output shaft.

In another aspect of the present invention, an automated manual transmission for a vehicle may include a shifting section provided with a plurality of shifting units for implementing different gear ratio between an input shaft and an output shaft, a variable power transfer unit transferring continuously and variably power of a power providing device to the shifting section in series by self-controllable slip operation, and a transfer gear that is connected to the variable power transfer unit and is engaged to a ring gear of a differential to transfer a power of the variable power transfer unit to the ring gear, wherein the variable power transfer unit is disposed between the power providing device and the transfer gear.

A clutch unit providing selectively the power of the power providing device to the input shaft or to the variable power transfer unit is provided between the power providing device and the input shaft. wherein the clutch unit may include a clutch disk that is connected to the input shaft and is selectively in contact with a fly wheel, and wherein a driving gear is connected to a clutch cover which surrounds an outer part of the clutch disk.

The automated manual transmission for the vehicle may further include a driven gear coupled to the variable power transfer unit and meshed with the driving gear to selectively transfer the power of the power providing device to the transfer gear in accordance with operation of the clutch unit.

The clutch is a double disk clutch provided with a plurality of clutch disks.

A shifting mechanism of the shifting section is configured in a synchro-mesh way in which a plurality of gears is synchronized and then meshed using a key and a synchronizer ring.

A shifting mechanism of the shifting section is configured by using a dog clutch.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
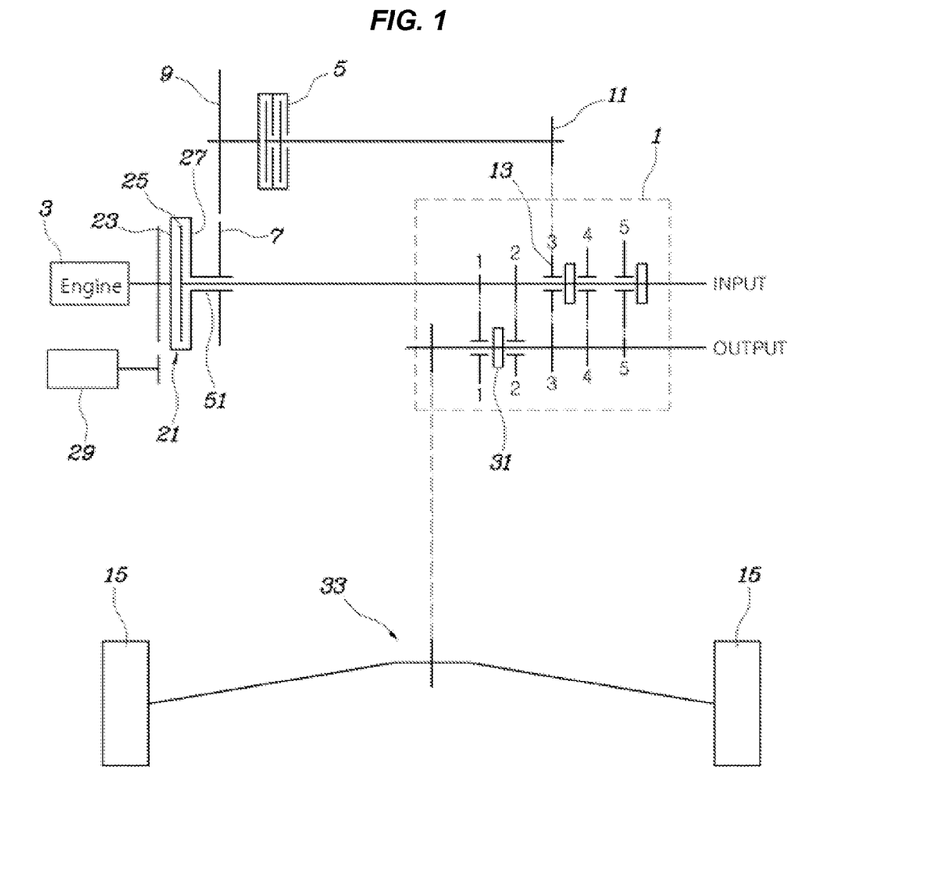
FIG. 1 is a view showing a structure of an automated manual transmission according to an exemplary embodiment of the present invention.

Referring to FIG. 1, an automated manual transmission according to an exemplary embodiment of the present invention includes: a shifting section 1 provided with a plurality of shifting units for implementing different gear ratio between an input shaft and an output shaft, and a variable power transfer unit 5 for transferring continuously and variably the power from a power providing device 3 to the shifting section 1 in series from the input shaft by self-controllable slip operation, which is disposed between the power providing device 3 for providing the power to the input shaft and the shifting section 1.

That is, with respect to the shifting section 1 having a conventional manual transmission shifting mechanism, power is transferred in series from the power providing device 3 to the variable power transfer unit 5 and is provided continuously to a driving wheel 15 so as to be in a roundabout way to the input shaft and pass through the shifting section 1, thereby preventing the torque decrease due to blocked power during a shifting.

In an exemplary embodiment of the present invention, the variable power transfer unit 5 may further include: a driving gear 7 coupled to a rotary shaft of the power providing device 3, a driven gear 9 that meshes with the driving gear 7 to transfer the power to the variable power transfer unit 5, and a transfer gear 11 that draws the power having passed through the variable power transfer unit 5 from the driven gear 9.

That is, a power transfer path that is formed in a roundabout way to the input shaft and runs to the shifting section 1 from the power providing device 3 is implemented through the driving gear 7, the driven gear 9, the variable power transfer unit 5 and the transfer gear 11, and thus a separate power transfer path is formed, through which power is transferred in a roundabout way to a conventional power transfer path passing through the input shaft.

In the present embodiment, the driven gear 9, the variable power transfer unit 5 and the transfer gear 11 are arranged coaxially each other and the coaxial shaft is arranged parallel to the input shaft and the output shaft.

Meanwhile, a clutch 21 for providing intermittently power from the power providing device 3 to the input shaft may be provided between the input shaft and the power providing device 3.

In the present embodiment, the power providing device 3 may be an engine of an internal combustion engine and further the clutch 21 may include a clutch disk 25 that is arranged to be in contact with a fly wheel 23 of the engine, and further the driving gear 7 may be arranged on a clutch cover 27 which surrounds the outer part of the clutch disk 25 and in which a hollow shaft 51 through which the input shaft passes is formed.

That is, the clutch disk 25 and the fly wheel 23 are arranged in the same manner as the conventional clutch mechanism, but in the present embodiment, there is difference in that the clutch cover 27 serves as a hollow rotary shaft for connecting the driving gear 7 to the fly wheel 23 and transferring rotation force. Through this configuration, a compact power train configuration is possible while using in maximum the conventional manual transmission clutch mechanism.

Meanwhile, the transfer gear 11 is meshed with the shifting gear of the input shaft that forms the middle gear ratio among a series of gear ratios implemented in the shifting section 1.

That is, in the present embodiment, the shifting section 1 is exemplary provided with a first to a fifth stages and R stage wherein the transfer gear 11 is meshed with the shifting gear 13 at the third stage, forming the third stage gear ratio among a series of gear ratios from the first stage to the fifth stage, and the power is transferred to the driving wheel 15 while it is third stage-shifted, in a roundabout way to the input shaft.

The reason for the transfer gear being connected to the shifting gear forming middle gear ratio among a series of gear ratios is that when the shifting is performed between various shifting ratios implemented by the corresponding shifting mechanism, the variable power transfer unit 5 is slip-controlled and provides continuously power corresponding to the speed of the shifting gear after and before shifting and at this time it intends to make the maximum value of the slip control amount of the variable power transfer unit 5 be small as possible.

Figure 7:
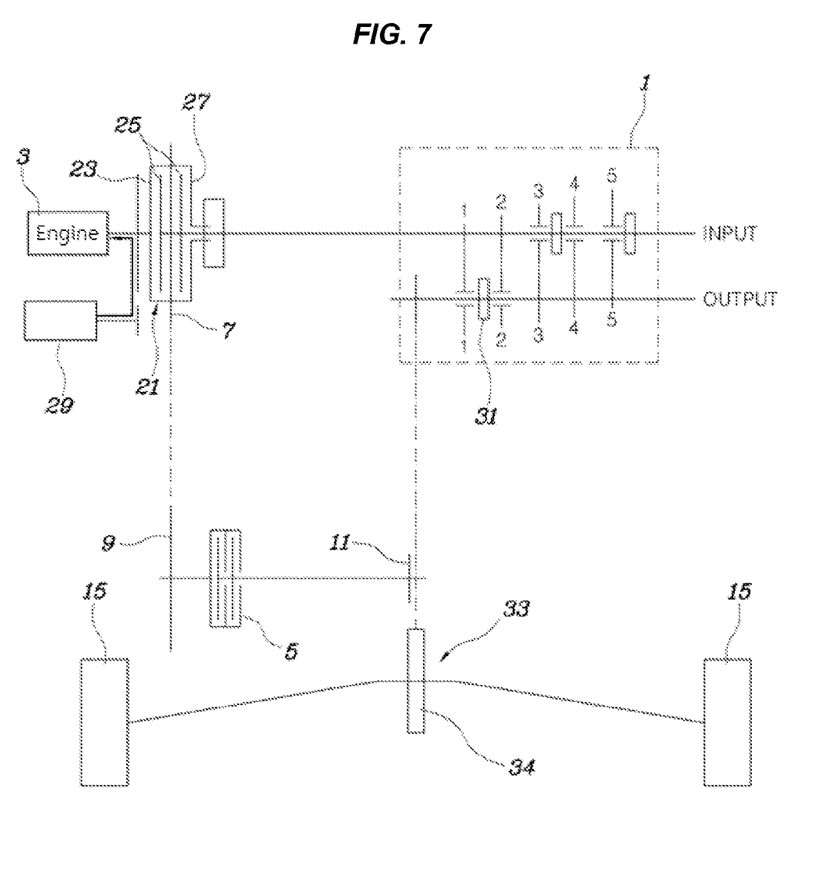
FIG. 7 is a view showing another embodiment of the present invention.

Meanwhile, FIG. 7 is a view showing another embodiment of the present invention wherein the automated manual transmission is configured similarly to the configurations of embodiments 1 to 6, however, there is difference in that the transfer gear 11 is meshed with a ring gear 34 of a differential 33 that receives power from the output shaft and transfers the power to the driving wheel 15 so that the power is provided to the driving wheel 15 through the differential 33 in a roundabout way to the input shaft and the output shaft through the variable power transfer unit 5.

Furthermore, the driving gear 7 may be connected to the clutch cover 27.

In this case, the variable power transfer unit 5 provides continuously the power proper for shifting between the respective shifting gear ratio to the driving wheel 15 by its self-slip operation.

Further, in the present embodiment, the clutch 21 is configured as double disk clutch provided with a plurality of clutch disks wherein the capacity of transferring power to the input shaft is ensured while decreasing the outer diameter of the clutch 21 to make the transmission be compact through the double disk clutch, which may be applied to the exemplary embodiments as shown in FIGS. 1 to 6.

In the exemplary embodiments of the present invention, the shifting mechanism of the shifting section 1 is configured in synchro-mesh way in which gears are synchronized and then meshed using a key and a synchronizer ring, however, in addition to this configuration, the shifting mechanism of the shifting section 1 may be configured by using other mechanism such as a dog clutch, etc.

Further, in the exemplary embodiments of the present invention, the variable power transfer unit 5 may be implemented by using a conventional wet or dry type multi plate clutch which is slip-controllable.

Hereinafter, operations of the exemplary embodiments will be described, referring to FIGS. 2 to 6. For reference, FIG. 6 is a view showing a driving state at an R stage of reversing driving and further showing a rear driving idler gear 35, which is omitted in FIGS. 1 to 5.

Further, detailed description of the operation of the exemplary embodiment as shown in FIG. 7 is omitted since it is operated in almost same way to the exemplary embodiments of FIGS. 1 to 6.

Figure 2:
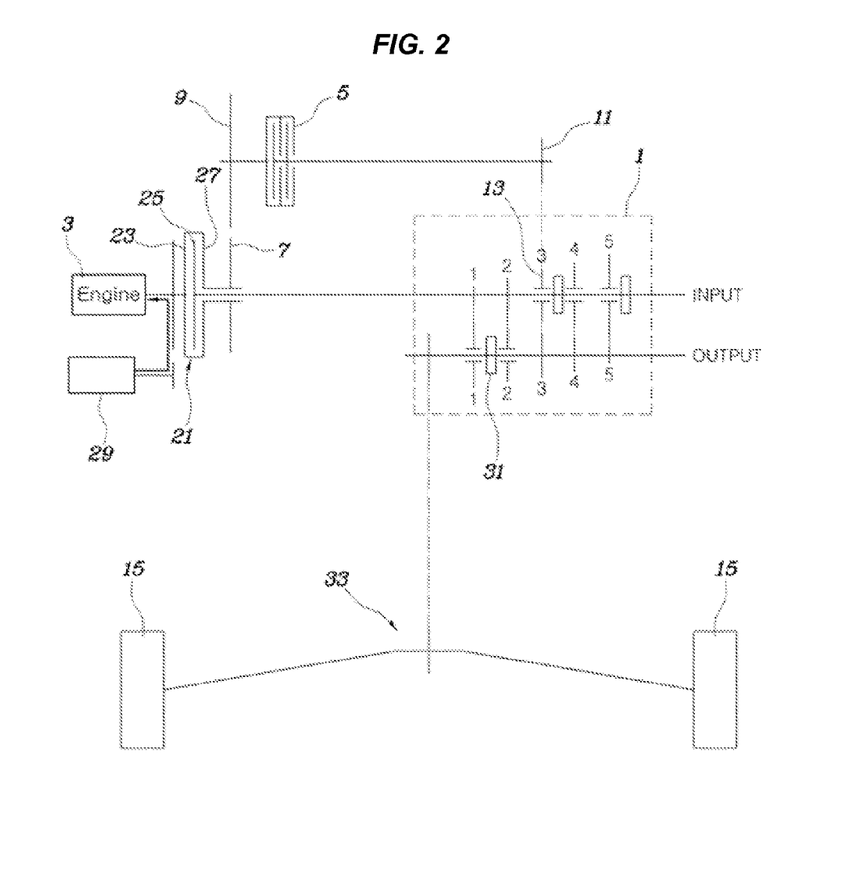
FIG. 2 is a view showing a power transference relation when an engine starts in the structure shown in FIG. 1.

FIG. 2 shows an engine starting state wherein the engine is cranked by a starting motor 29 and is started while the clutch 21 and the variable power transfer unit 5 are all blocked. Accordingly, a rotation force of the engine is transferred only to the driving gear 7 and the driven gear 9 while power is not transferred to the input shaft and the output shaft.

Of course, the engine may start while the clutch is connected if the shifting section 1 does not connect any shifting gears when the engine is started.

Figure 3:
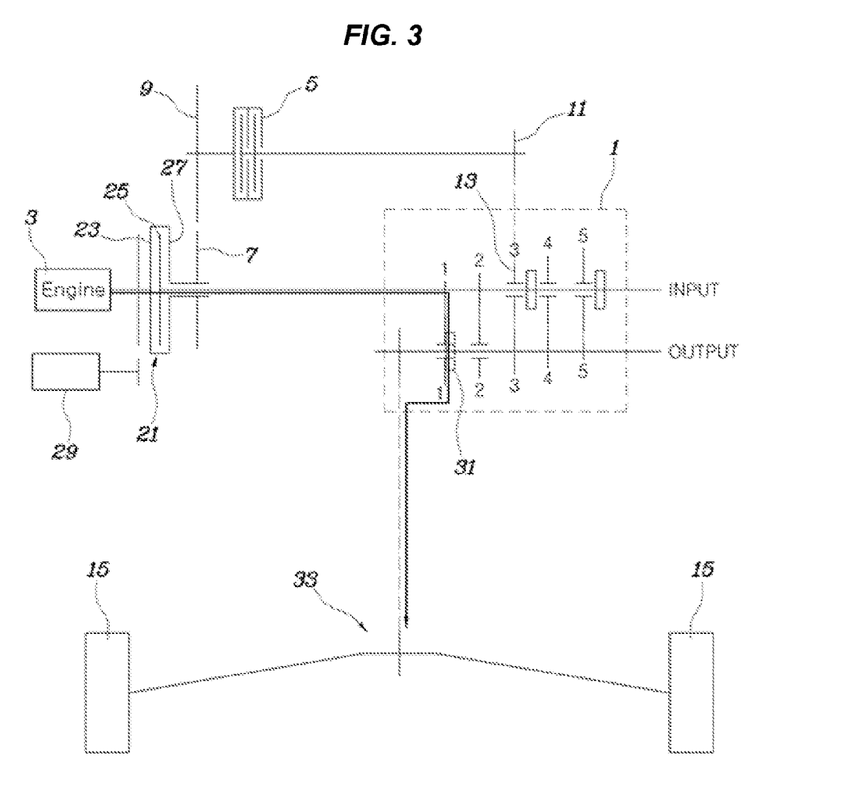
FIG. 3 is a view showing a power transference relation when a vehicle drives at a first stage in the structure shown in FIG. 1.

In the above-described state, when the clutch 21 is cut, the first stage shifting gears may be configured by a first-second stage synchro-mesh device 31, and when the clutch 21 is connected while the first stage shifting gears are formed, a vehicle accelerates and drives at a first stage as shown in FIG. 3.

In FIG. 3, power from an engine is transferred to the input shaft through the clutch 21 and then transferred to the output shaft while it is shifted to a first stage through a first shifting gear pair, and provided to a driving wheel 15 through a differential 33.

At this time, the variable power transfer unit 5 is kept in a power blocking state and the power through the driving gear 7 and the driven gear 9 is not transferred to the third stage shifting gear 13.

Figure 4:
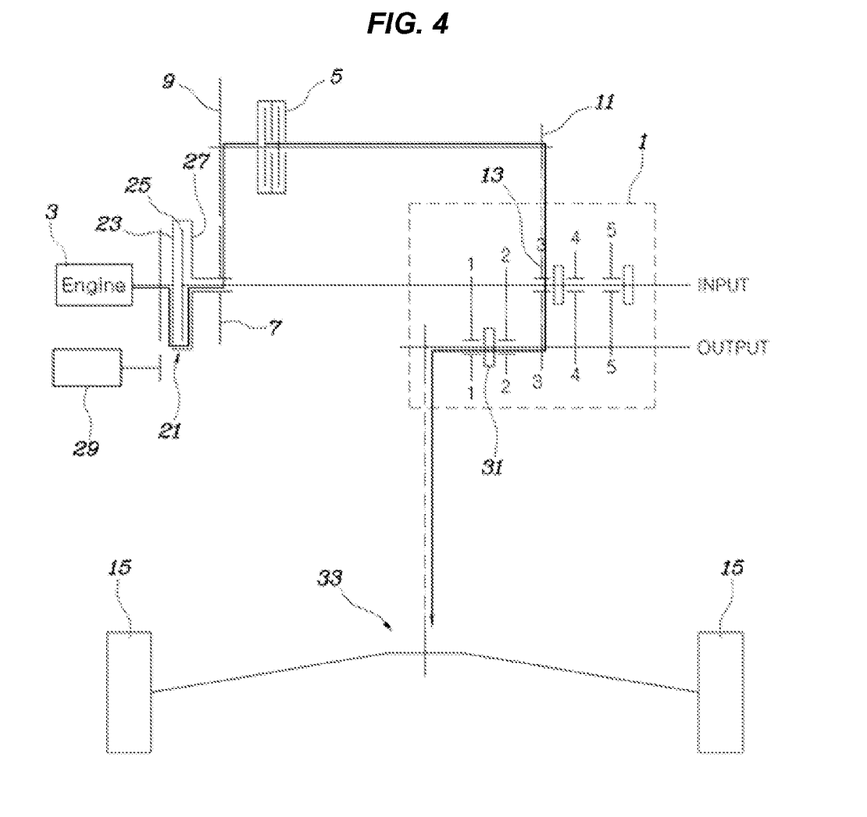
FIG. 4 is a view showing a power transference relation while a first stage is shifted to a second stage in the structure shown in FIG. 1.

FIG. 4 shows an intermediate course of shifting from a first stage to a second stage wherein when the variable power transfer unit 5 is connected while the clutch 21 is cut, the power from the engine is transferred to the third stage shifting gear 13 through the driving gear 7, the driven gear 9 and the transfer gear 11 and shifted to the third stage to be provided to the driving wheel while the power is blocked to the input shaft, thereby preventing toque decrease during a shifting.

At this time, the power to be transferred from the variable power transfer unit 5 is adjusted by the slip control from a state for corresponding a rotation speed of the output shaft in a first stage to a state for corresponding to a rotation speed of the output shaft in a second stage, thereby preventing the torque decrease caused from blocking the torque being transferred to the input shaft by the clutch 21 during a shifting from a first stage to a second stage, and being capable of connecting smoothly a current stage and a target-stage.

As described above, the first-second stage synchro-mesh device 31 releases a first stage and completes the mesh to a second stage while the clutch 21 is cut and the variable power transfer unit 5 is connected and thus power from the engine is supplied to the driving wheel 15 in a roundabout way through the transfer gear 11 and the third stage shifting gear 13.

Figure 5:
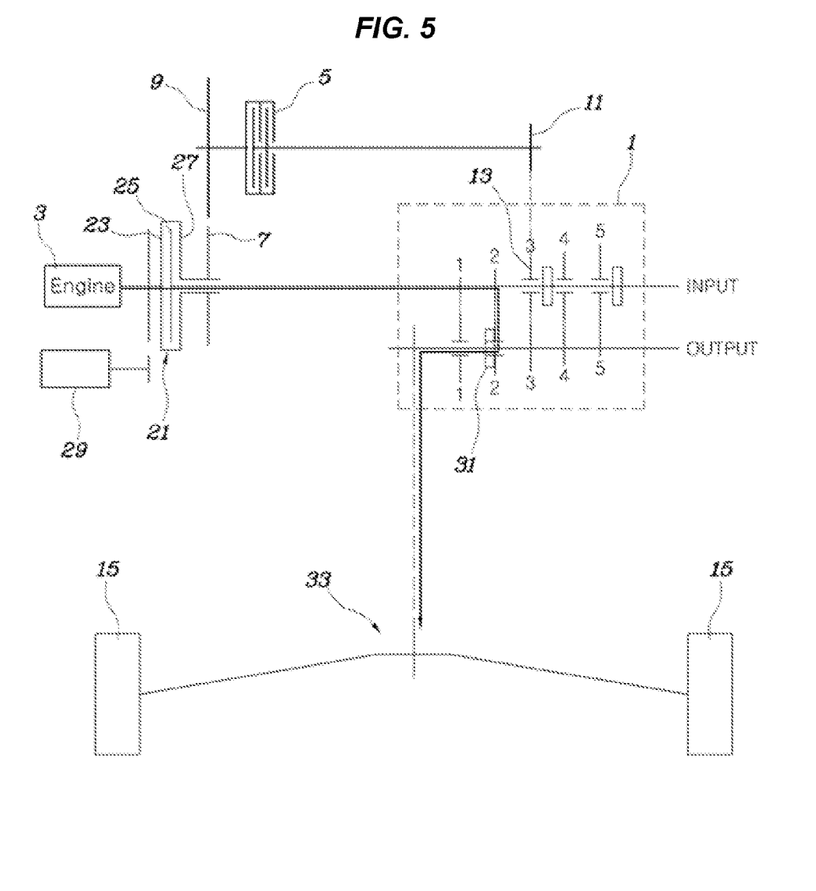
FIG. 5 is a view showing a power transference relation when a vehicle drives at a second stage in the structure shown in FIG. 1.
Figure 6:
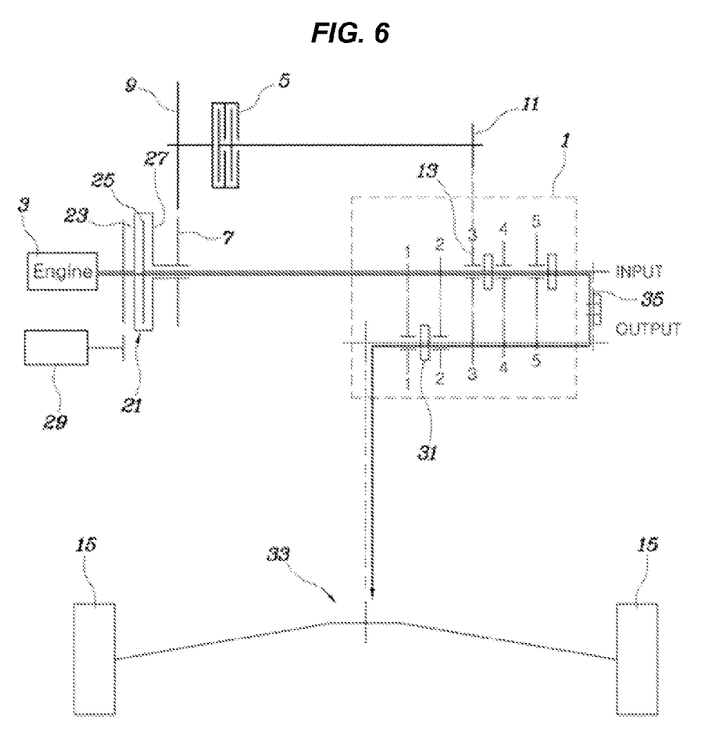
FIG. 6 is a view showing a power transference relation when a vehicle drives at an R stage in the structure shown in FIG. 1.

After the second stage shifting gears are meshed, the variable power transfer unit 5 is cut while connecting the clutch 21 and then a second stage driving is implemented, as shown in FIG. 5.

In FIG. 5, the power from an engine is adjusted to a second stage shifting between the input shaft and the output shaft through the clutch 21 and is supplied to a driving wheel 15 through the differential 33 while the power that has been transferred from the engine to the driven gear 9 is blocked by the variable power transfer unit 5.

The continuous power supply to the driving wheel 15 by the driving gear 7, the driven gear 9, and the variable power transfer unit 5 during a shifting of a first stage to a second stage is performed in the same way as other stages. Specially, even in case of shifting between high stages such as a fourth and fifth stage, even overdrive shifting stage, in addition to a shifting between a first stage and a second stage, the power is compensated while a rotation speed of the output shaft of current shifting stage and a target shifting stage is corresponded continuously, thereby preventing the torque decrease and providing stable and smooth shifting feeling within an entire shifting range of the transmission.

Meanwhile, FIG. 6 shows a power transference situation while a vehicle is rear-driven wherein the rear driving idler gear 35 between the input shaft and the output shaft is connected while a vehicle is stopped, thereby implementing a rear driving shifting stage.

According to an exemplary embodiment of the present invention, an automated manual transmission is provided that can improve the commercial value of a vehicle by preventing non-smooth shifting to achieve smooth and stable shifting feeling, by transferring a separate power to a driving wheel during a shifting while using a conventional shifting mechanism in which power is blocked instantaneously necessarily and connected.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automated manual transmission for a vehicle comprising:
    a shifting section provided with a plurality of shifting units for implementing different gear ratio between an input shaft and an output shaft;
    a variable power transfer unit transferring continuously and variably power of a power providing device to the shifting section in series by self-controllable slip operation,
    a driving gear engaged to the power providing device;
    a driven gear that is connected to the variable power transfer unit and meshes with the driving gear to transfer the power of the power providing device to the variable power transfer unit; and
    a transfer gear coupled to the variable power transfer unit and receiving the power having passed through the variable power transfer unit from the driven gear,
    wherein the variable power transfer unit is disposed between the power providing device and the shifting section.

2. The automated manual transmission for the vehicle of claim 1, wherein the driven gear, the variable power transfer unit and the transfer gear are arranged coaxially to each other and are arranged parallel to the input shaft and the output shaft.

3. The automated manual transmission for the vehicle of claim 1, wherein a clutch unit providing selectively the power from the power providing device to the input shaft or to the variable power transfer unit is provided between the power providing device and the input shaft.

4. The automated manual transmission for the vehicle of claim 3,
    wherein the power providing device is an engine of an internal combustion engine,
    wherein the clutch unit includes a clutch disk that is connected to the input shaft and is selectively in contact with a fly wheel of the engine, and
    wherein the driving gear is connected to a hollow shaft coupled to a clutch cover which surrounds an outer part of the clutch disk, the input shaft configured to pass through the hollow shaft.

5. The automated manual transmission for the vehicle of claim 4, wherein the transfer gear is meshed with a shifting gear of the input shaft that forms a middle gear ratio among a series of gear ratios implemented in the shifting section.

6. The automated manual transmission for the vehicle of claim 1, wherein a clutch is provided between the input shaft and the power providing device, and the clutch is a double disk clutch provided with a plurality of clutch disks.

7. The automated manual transmission for the vehicle of claim 1, wherein a shifting mechanism of the shifting section is configured in a synchro-mesh way in which a plurality of gears are synchronized and then meshed using a key and a synchronizer ring.

8. The automated manual transmission for the vehicle of claim 1, wherein a shifting mechanism of the shifting section is configured by using a dog clutch.

9. The automated manual transmission for the vehicle of claim 1, wherein a rear driving idle gear is arranged between the input shaft and the output shaft.

10. An automated manual transmission for a vehicle comprising:
    a shifting section provided with a plurality of shifting units for implementing different gear ratio between an input shaft and an output shaft;
    a variable power transfer unit transferring continuously and variably power of a power providing device to the shifting section in series by self-controllable slip operation; and
    a transfer gear that is connected to the variable power transfer unit and is engaged to a ring gear of a differential to transfer a power of the variable power transfer unit to the ring gear,
    wherein the variable power transfer unit is disposed between the power providing device and the transfer gear.

11. The automated manual transmission for the vehicle of claim 10, wherein a clutch unit providing selectively the power of the power providing device to the input shaft or to the variable power transfer unit is provided between the power providing device and the input shaft.

12. The automated manual transmission for the vehicle of claim 11,
    wherein the clutch unit includes a clutch disk that is connected to the input shaft and is selectively in contact with a fly wheel, and
    wherein a driving gear is connected to a clutch cover which surrounds an outer part of the clutch disk.

13. The automated manual transmission for the vehicle of claim 12, further including;
    a driven gear coupled to the variable power transfer unit and meshed with the driving gear to selectively transfer the power of the power providing device to the transfer gear in accordance with operation of the clutch unit.

14. The automated manual transmission for the vehicle of claim 10, wherein a clutch is provided between the input shaft and the power providing device, and the clutch is a double disk clutch provided with a plurality of clutch disks.

15. The automated manual transmission for the vehicle of claim 10, wherein a shifting mechanism of the shifting section is configured in a synchro-mesh way in which a plurality of gears are synchronized and then meshed using a key and a synchronizer ring.

16. The automated manual transmission for the vehicle of claim 10, wherein a shifting mechanism of the shifting section is configured by using a dog clutch.

* * * * *